United States Patent [19]

Hancock

[11] Patent Number: 4,471,912

[45] Date of Patent: Sep. 18, 1984

[54] WATERBUBBLE NOZZLE

[76] Inventor: Homer H. Hancock, 4025 State St., Space 59, Santa Barbara, Calif. 93110

[21] Appl. No.: 461,461

[22] Filed: Mar. 1, 1983

[51] Int. Cl.$^3$ ............................................. B05B 1/34
[52] U.S. Cl. ................................................. 239/497
[58] Field of Search ............... 239/463, 491, 494, 496, 239/497, 462, 468, 487, 499

[56] References Cited

U.S. PATENT DOCUMENTS

| 1,714,850 | 5/1929 | De Whalley | 239/497 X |
| 2,176,356 | 10/1939 | Paasche | 239/494 X |
| 2,761,736 | 9/1956 | Dennison | 239/491 X |

FOREIGN PATENT DOCUMENTS

| 0709681 | 6/1954 | United Kingdom | 239/497 |
| 0643205 | 1/1979 | U.S.S.R. | 239/497 |

Primary Examiner—John J. Love
Assistant Examiner—Mary F. McCarthy

[57] ABSTRACT

A nozzle attachment connected to the end of a garden hose for emitting a big, soft bubble of water suitable for gently and copiously watering anything in the backyard vegetable and flower gardens, even small lawns. The attachment includes a control valve operable to reduce the bubble size to accommodate the watering of potted plants like a small spouted watering can; or the control valve can be opened wide to produce large drops like rain falling gently of its own weight with a capacity of more than four gallons per minute, and unlike a sprinkling or watering can, it never runs dry.

1 Claim, 4 Drawing Figures

U.S. Patent  Sep. 18, 1984  4,471,912
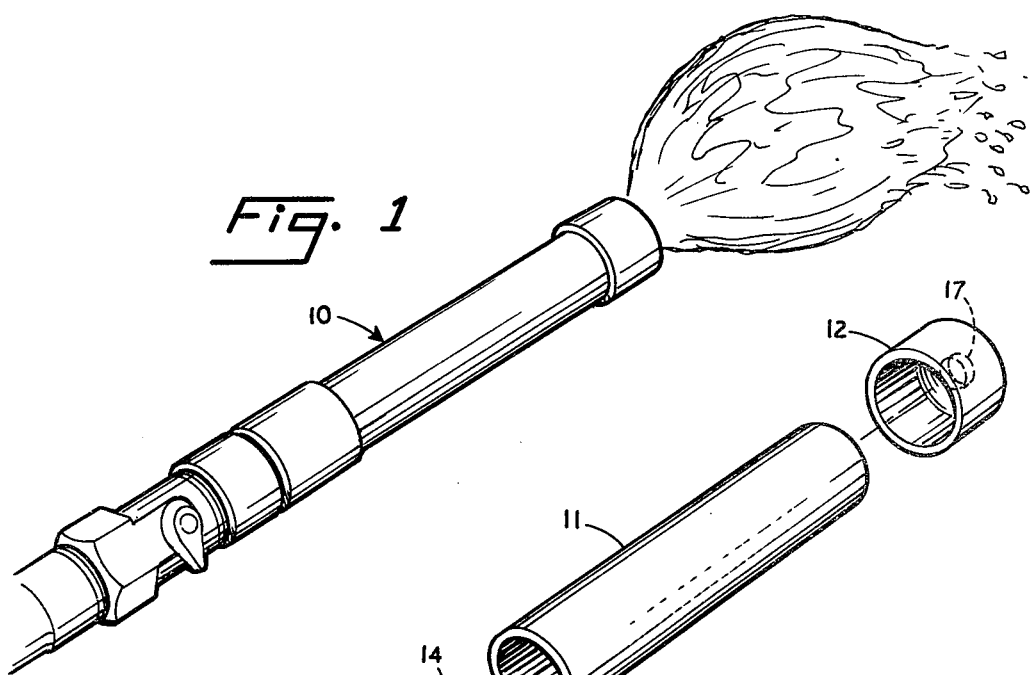
Fig. 1
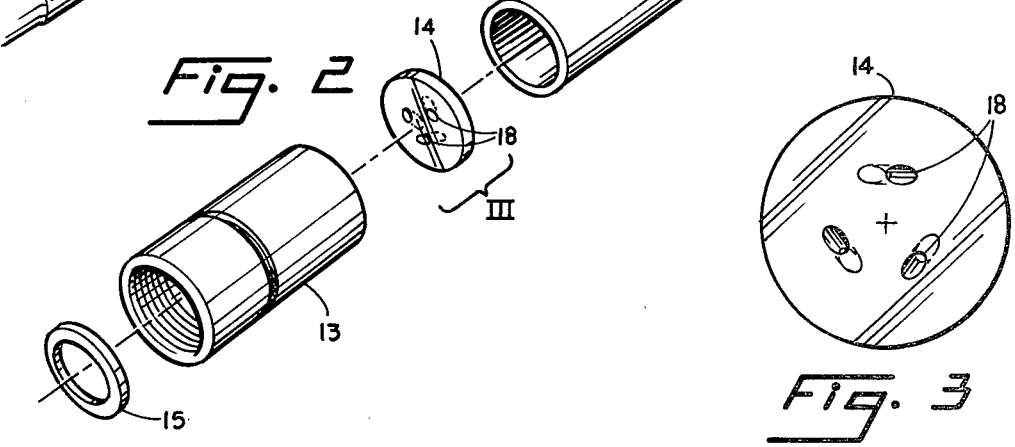
Fig. 2
Fig. 3
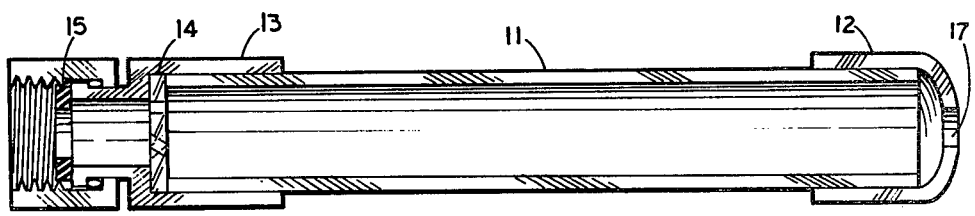
Fig. 4

WATERBUBBLE NOZZLE

BRIEF SUMMARY OF THE INVENTION

This invention relates to a garden-hose nozzle producing a large water bubble comparable to a three- to eight inch soap bubble. The top half of the water bubble ranges in size up to some eight inches in diameter depending upon the amount and pressure of water supplied to the nozzle by the operator. The bubble produced is very gentle, especially so when held close enough to the ground for the bubble itself to bathe the ground and tender vegetation as the operator moves right along keeping the amount of water under complete control. When held at various heights above ground the bubble naturally breaks up into patterns of droplets of varying wider widths, falling to earth of its own weight, and is much more gentle than when thumbing the end of a hose (as many do), and is always under control of the operator.

The phenomenon of the bubble was discovered while experimenting with large-hole water nozzles to produce a wide circle of gentle fog-mist as described in my Ser. No. 214,480, now U.S. Pat. No. 4,403,737 issued Sept. 13, 1983. When I moved the special diaphragm (described in FIG. 7 of that application) several inches back from the large nozzle hole, instead of fine mist, a large water bubble appeared.

BRIEF DESCRIPTION OF DRAWINGS

FIG. 1: The complete invention depicting a water bubble.

FIG. 2: The complete invention with parts lined up separated as when assembling.

FIG. 3: Blown-up view of the special diaphragm.

FIG. 4: Cutaway view of the fully assembled "Waterbubble Nozzle.

DETAILED DESCRIPTION

FIG. 1: The overall length of the complete waterbubble nozzle 10 is eight inches long. This working model is made out of PVC plastic pipe and plastic pipe fittings, size ¾ inch. The overall length does not include the pictured hose-threaded cut-off valve.

FIG. 2: This figure pictures each respective part of the invention. Describing them by name from left to right they are: hose washer 15; ¾" slip-on swivel hose-threaded adapter 13; one-inch by ⅛" disc/diaphragm 14 depicting three apetures 18; a six-inch nipple 11; and a ¾" slip-on end cap 12 with a 7/16" nozzle hole 17 drilled in the exact center of the end.

FIG. 3: A blown-up view of the special diaphragm 14. This is manufactured from ⅛" stock of plasti-glass one inch in diameter. The three 3/32" apertures 18 are drilled ¼ inch from the outside edge of the disc, equally distanced around center, inclined at 45° angle, pointed slightly above a marking for the apeture ahead. FIG. 4; A cutaway view of the fully assembled and cemented waterbubble nozzle. Note particularly the diaphragm 14 between down-stream side of stop ring of hose adapter 13 and up-stream end of water conduit nipple 11. Water flowing from garden hose through cut-off valve (neither numbered) thence through throat of hose adapter 13 where is is swirled as it passes through the inclined apetures of diaphragm 14 into conduit 11 and continues swirling through conduit 11 the entire six inches where it emerges nozzle hole 17 as a large waterbubble.

MODE OF OPERATION

The size and softness of the waterbubble is controlled by the simple hose-threaded cut-off valve, or if preferred, by a pistol-grip hose-threaded watering device with male hose threads at the down-stream end.

In order to reach the ground with the large waterbubble a couple of feet of hose with the nozzle can be let down through the hands of the operator, but is is much better to use an extension conduit between the end of garden hose and the waterbubble nozzle. They may be purchased or easily made with the desired length of ½ inch plastic pipe and a female and male hose-threaded plastic ⅛" pipe fixtures.

I claim as my invention:

1. A nozzle attachment adapted to be connected to the end of a garden hose designed and arranged so as to produce a waterbubble for fast and gentle watering of small vegetable and flower gardens comprising:

coupling means for connecting the nozzle attachment to the end of the garden hose, said coupling means including a bore-threaded plastic pipe adapter, a valve means connected to said adapter for controlling the water flow within the nozzle attachment;

a disc or diaphragm secured within the adapter and having three apertures therein, the longitudinal axis of the apertures being radially and axially directed with respect to the longitudinal axis of the adapter for swirling the water within the adapter;

an elongated plastic pipe conduit connected at one end to the adapter;

a plastic pipe end cap connected to the other end of the plastic pipe conduit with a centrally located hole in the end of the cap which serves as the nozzle hole, the length of the elongated plastic pipe and the diameter of the centrally located hole being chosen such that the swirled water discharged from the apertures is emitted from the nozzle attachment as a waterbubble of a size and capacity adjustable by the valve means.

* * * * *